United States Patent [19]

French

[11] 3,732,434
[45] May 8, 1973

[54] PIPELINE PIGS

[75] Inventor: Hartley A. French, Willowdale, Ontario, Canada

[73] Assignee: Trans-Canada Pipe Lines Limited, Toronto, Ontario, Canada

[22] Filed: Mar. 2, 1972

[21] Appl. No.: 231,217

[52] U.S. Cl............307/118, 15/104.6 R, 73/40.5 R
[51] Int. Cl.................................................H01h 35/18
[58] Field of Search....................................137/802, 1; 15/104.6 R; 346/33 P; 73/40.5 R; 307/116, 117, 118

[56] References Cited

UNITED STATES PATENTS 2,951,362   9/1960   Dean et al..........................73/40.5 R Primary Examiner—Herman J. Hohauser
Attorney—R. Gordon Waldie

[57] ABSTRACT

This invention provides a pipeline pig for transporting electrical circuitry through a pipeline. The pipeline pig includes a pressure-sensitive switch on the housing which is designed to electrically activate the electrical circuitry when the internal pipeline pressure exceeds a predetermined level. When the pressure does not exceed that level, the electrical circuitry remains inactive.

6 Claims, 2 Drawing Figures

PATENTED MAY 8 1973    3,732,434

PIPELINE PIGS

This invention relates to improvements in pipeline pigs commonly used for a variety of purposes in fluid-carrying pipelines.

The pipeline industry conventionally utilizes pipeline pigs to accomplish certain specialized operations inside pipelines. Commonly, pipeline pigs include an elongated body which is retained centrally of the pipeline by two or more flexible, radially outwardly extending scraper cups spaced apart longitudinally and fitting snugly but slidably (due to their resilience) within the pipeline.

Pipeline pigs are forced through the pipeline by pressure from the fluid behind the pig exerted on the body of the pig and on the scraper cups attached thereto.

The body of a pipeline pig can support brushes, scrapers, or other devices for cleaning the interior wall of the pipeline. Other pipeline pigs do not carry cleaning elements, but are used simply as separation pigs for separating two different fluids being consecutively passed through the pipeline. Still other pipeline pigs are used to remove fluid trapped at low spots in the pipeline. There are also in use certain kinds of pipeline pigs which carry checking and measuring instrumentation through the pipeline to measure fluid characteristics, to check the pipeline itself, or to accomplish any of a large number of measurements or safety checks necessary to the proper maintenance and operation of a pipeline.

It is to this latter group of pipeline pigs, those carrying instrumentation through the pipeline, that this invention particularly relates.

The ever-increasing use of instrument-carrying pigs in pipelines necessarily carries with it certain considerations regarding safety. When such instrument-carrying pigs utilize electrical circuitry, and when the pipeline is carrying a fluid that forms an explosive mixture with air, it becomes highly desirable to ensure that the construction of the pipeline pig permits no contact between an electrical spark in the circuitry and the region where the explosive mixture may be formed.

Because of the above-mentioned danger of explosion with pipeline pigs carrying spark-producing electrical circuitry with an energy level sufficient to cause an explosion in a hazardous atmosphere, it is an object of this invention to provide a pipeline pig in which the risk of explosion through spark-producing circuitry is minimized.

It is a further object of this invention to provide a pipeline pig for carrying spark-producing electrical circuitry, in which the circuitry is not activated until a predetermined operating pressure has been achieved inside the pipeline behind the pipeline pig.

Accordingly, this invention provides a pipeline pig for transporting electrical circuitry through a pipeline, the pipeline pig comprising: a housing supporting said electrical circuitry, means for supporting the housing for translational movement within the pipeline, and a pressure-sensitive switch on the housing adapted to electrically activate said electrical circuitry when the internal pipeline pressure exceeds a predetermined level, and adapted to render the electrical circuitry inactive when the internal pipeline pressure does not exceed said predetermined level.

In a preferred embodiment, the housing is pressure-tight, and contains as much as possible of the electrical circuitry and battery means for energizing the circuitry. The housing is filled with an inert gas such as nitrogen at a low pressure, and the pressure-sensitive switch operates on the basis of the differential between the pipeline pressure and the pressure inside the housing. This ensures that, if the housing should develop a leak, the internal housing pressure would rise to the same level as that in the pipeline, thereby eliminating any differential between the pipeline and the housing, and thus opening the pressure-sensitive switch to cut the connection between the electrical circuitry and the battery means.

One embodiment of this invention is shown in the accompanying drawings, wherein like numerals denote like parts throughout the several views, and in which.

Figure 1:
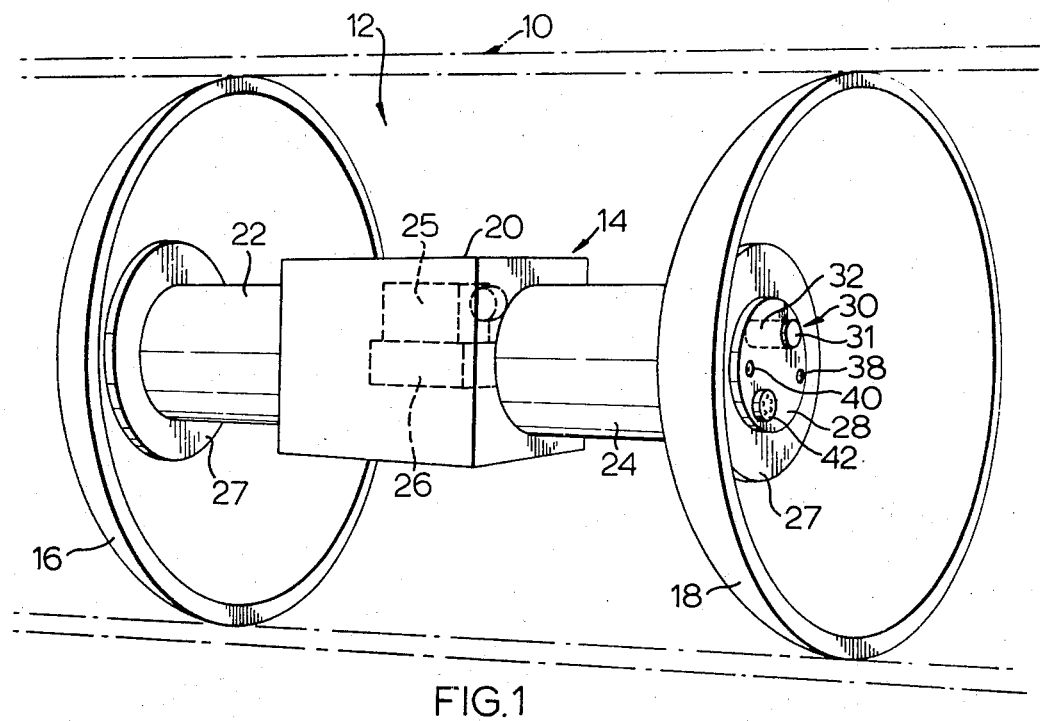
FIG. 1 is a perspective view of a pipeline pig embodying this invention.

In FIG. 1, a pipeline 10 shown in broken lines is seen to contain a pipeline pig 12. The pipeline pig 12 generally includes a pig body 14, a forward scraper cup 16, and a rear scraper cup 18. The pig body 14 is made up of a central, pressure-tight housing 20 which is shown in the shape of a rectangular parallelepiped but which may have any appropriate configuration, a forward cylindrical extension 22 and a rearward cylindrical extension 24. The configuration of the pig body 14 forms no part of this invention.

The desired electronic equipment 25 and one or more batteries 26 are housed within the pressure-tight housing 20, as shown in broken lines in FIG. 1. The specific construction of the electronic equipment and the batteries forms no part of this invention, and so no detailed description is here included. The electronic equipment 25 could be testing, measuring and/or recording equipment of the kind conventionally transported in instrument-carrying pipeline pigs.

The scraper cups 16 and 18 are of conventional shape, resembling hollow spherical segments attached at their axes of symmetry to the ends of the respective cylindrical extensions 22 and 24. Both of the scraper cups open in the same direction, i.e. rearwardly with respect to the direction of travel of the pipeline pig 12, the latter being to the left. At the distal end of each cylindrical extension 22 and 24 are located two cup flanges 27 between which the respective scraper cup is sandwiched. Only one cup flange 27 is visible at the end of each cylindrical extension, because the respective scraper cup hides the other one.

In the rear face 28 of the rearward cylindrical extension 24 is located a pressure-sensitive switch 30 of which the pressure sensing element 31 is exposed to the fluid pressure within the pipeline immediately to the rear of the pig, while the electrical switching element 32 (operated by the pressure sensing element 31) is located inside the pressure-tight cylindrical extension 24 so that it is in no way exposed to the contents of the pipeline. The pressure-sensitive switch 30 is preferably one which operates on the differential between the pressure in the pipeline and the pressure inside the housing 20. Preferably, the housing contains nitrogen at a very low pressure, for example 1 psia. When a predetermined pipeline pressure is reached, say 25 p.s.i. in excess of the internal housing pressure, the electrical switching element 32 is closed.

Figure 2:
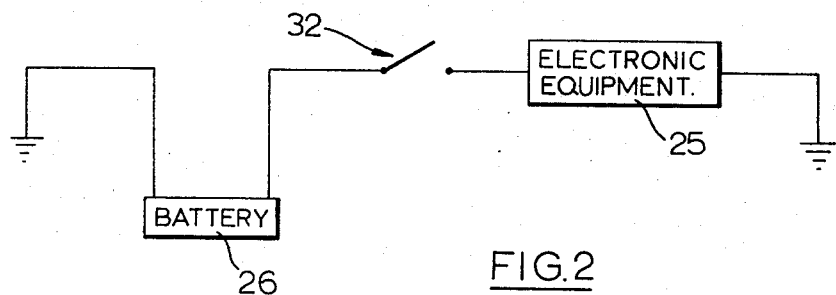
FIG. 2 is a schematic diagram showing the principal features of the electrical circuit in the pipeline pig of FIG. 1.

As seen in FIG. 2, the electrical switching element 32 is adapted to open and close the electrical connection between the battery 26 and the electronic equipment 25. Unless the pressure differential between the pipeline interior and the housing interior exceeds a given predetermined amount, the electrical switching element 32 remains open.

With this preferred construction, the electronic equipment in the pipeline pig is not electrically alive until the pipeline pressure reaches a predetermined amount, and it is possible to ensure that full line pressure is achieved only after all air has been purged from the pipeline and the pig launcher.

Another advantage of this preferred construction of the pipeline pig described above is that, should the housing 20 begin to leak, the fluid in the pipeline would enter the housing and very soon would equalize the pressures inside and outside the housing. This would cause the pressure-sensitive switch 30 to open, and disconnect the battery from the electrical equipment, thus eliminating the risk of sparking.

To permit the pressure-tight housing 20 to be purged of air and filled with an inert gas at low pressure, such as nitrogen, two connectors 38 and 40 are provided in the rear face 28 of the cylindrical extension 24.

A hermetically sealed multiple electric socket 42 is provided for the purpose of conveying the sensing circuits through the housing wall from the interior of the housing.

In the preferred method of using the pipeline pig described above, the pig is first inserted in the launcher apparatus, the launcher is then sealed, nitrogen (as a typical inert gas) under pressure is then injected into the launcher in the space between the scraper cups 16 and 18 and behind the rear scraper cups 18 so that any air can be purged, and natural gas is then allowed to flow into the pipeline ahead of the forward scraper cup 16. The gas is allowed to flow out at the downstream end until all air in the pipeline has been purged. The pig trap apparatus is located at the other end (the downstream end) of the pipeline section under test, and the pipeline pig travels to and becomes caught in the pig trap apparatus. By following the foregoing practice, the risk of an explosion, already greatly reduced by virtue of the construction of the pipeline pig, is further minimized because at no time does a mixture of air and natural gas exist in the area where the pig is located.

It is to be understood that the switch 30 could be one which operates independently of the internal housing pressure. For example, an evacuated bellows-type pressure-sensing switch could be employed, which senses the effective differential between its own vacuum and the internal pipeline pressure.

An additional safeguard against the risk of explosion from a sparking circuit is the encapsulation in plastic of as much as possible of the electrical circuitry, particularly that portion of the latter which may of necessity be carried on the outside of the housing or in some other way be exposed to the fluid in the pipeline.

A further safety precaution would be the restriction that all circuits external to the pressure tight container shall be limited to signal circuits operating at energy levels below that needed to cause an explosion in the event that a spark were caused by broken wires or some other defect.

What I claim is:

1. A pipeline pig for transporting electrical circuitry through a pipeline, the pipeline pig comprising:
    housing means supporting said electrical circuitry,
    means for supporting the housing means for translational movement within the pipeline,
    sealed chamber means maintaining an internal pressure lower than the working pressure of the pressurized pipeline,
    and a pressure-sensitive switch on the housing adapted to electrically activate said electrical circuitry when the pressure in the pipeline longitudinally adjacent the pig exceeds the pressure within said chamber means by at least a predetermined amount, and adapted to render the electrical circuitry inactive when the pipeline pressure does not exceed the pressure within said chamber means by at least said predetermined amount.

2. A pipeline pig for transporting battery means and electrical circuitry through a pressurized pipeline, the pipeline pig comprising:
    a pressure-tight housing containing said electrical circuitry, the pressure within said housing being lower than the working pressure of the pressurized pipeline,
    scraper-cup means for supporting the pressure-tight housing within the pipeline,
    and a pressure-sensitive switch on the housing adapted to electrically connect said battery means with said electrical circuitry when the pressure in the pipeline longitudinally adjacent the pig exceeds the pressure within said housing by at least a predetermined amount, and adapted to open the electrical connection between the battery means and the electrical circuitry when the pressure in the pipeline longitudinally adjacent the pig does not exceed the pressure within said housing by at least said predetermined amount.

3. The invention claimed in claim 2, in which the housing has connector means by which it can be filled with an inert gas.

4. The invention claimed in claim 2, in which the housing contains low-pressure nitrogen.

5. The invention claimed in claim 2, in which some at least of the electrical circuitry is encapsulated in plastic.

6. The invention claimed in claim 2, in which the pressure-sensitive switch senses the pipeline pressure to the rear of the pipeline pig.

* * * * *